United States Patent
Wageman et al.

(10) Patent No.: US 7,697,667 B1
(45) Date of Patent: Apr. 13, 2010

(54) VOICEMAIL RECALL FEATURE

(75) Inventors: Anthony J. Wageman, Lee's Summit, MO (US); Mark R. Bales, Kansas City, MO (US); Farni Weaver, Spring Hill, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1237 days.

(21) Appl. No.: 11/234,541

(22) Filed: Sep. 23, 2005

(51) Int. Cl.
*H04M 1/64* (2006.01)
(52) U.S. Cl. .................. 379/88.25; 379/142.06
(58) Field of Classification Search .... 379/88.22–88.25
See application file for complete search history.

(56) References Cited

U.S. PATENT DOCUMENTS

| | | | | |
|---|---|---|---|---|
| 4,652,700 | A | * | 3/1987 | Matthews et al. ........ 379/88.26 |
| 5,579,381 | A | * | 11/1996 | Courville et al. ........ 379/106.09 |
| 5,661,782 | A | | 8/1997 | Bartholomew et al. |
| 5,966,351 | A | * | 10/1999 | Carleton et al. .......... 369/29.01 |
| 6,067,299 | A | | 5/2000 | DuRee |
| 6,614,887 | B1 | | 9/2003 | Satapathy et al. |
| 6,625,260 | B1 | * | 9/2003 | Brockman et al. ........ 379/88.21 |
| 6,850,604 | B2 | * | 2/2005 | Cannell et al. ........... 379/93.01 |
| 7,221,743 | B2 | * | 5/2007 | Trinkel .................... 379/88.23 |

* cited by examiner

*Primary Examiner*—Simon Sing

(57) ABSTRACT

A voicemail apparatus comprises a voicemail database for storing messages awaiting retrieval by a subscriber, wherein each stored message comprises a message header and message data, the message header including a calling party phone number and calling party network information. A voicemail controller is coupled to the voicemail database for handling an incoming call from a calling party to the subscriber. The voicemail controller compares the calling party phone number of the incoming call with calling party phone numbers of each of the stored messages for the subscriber. If the calling party phone number of the incoming call matches at least one calling party phone number of the stored messages then the incoming call is authenticated by comparing the calling party network information for the incoming call with calling party network information stored for the calling party phone number matching messages. If authenticated, then an option is presented to the calling party of the incoming call to alter those stored message for which the calling party network information matches.

23 Claims, 4 Drawing Sheets

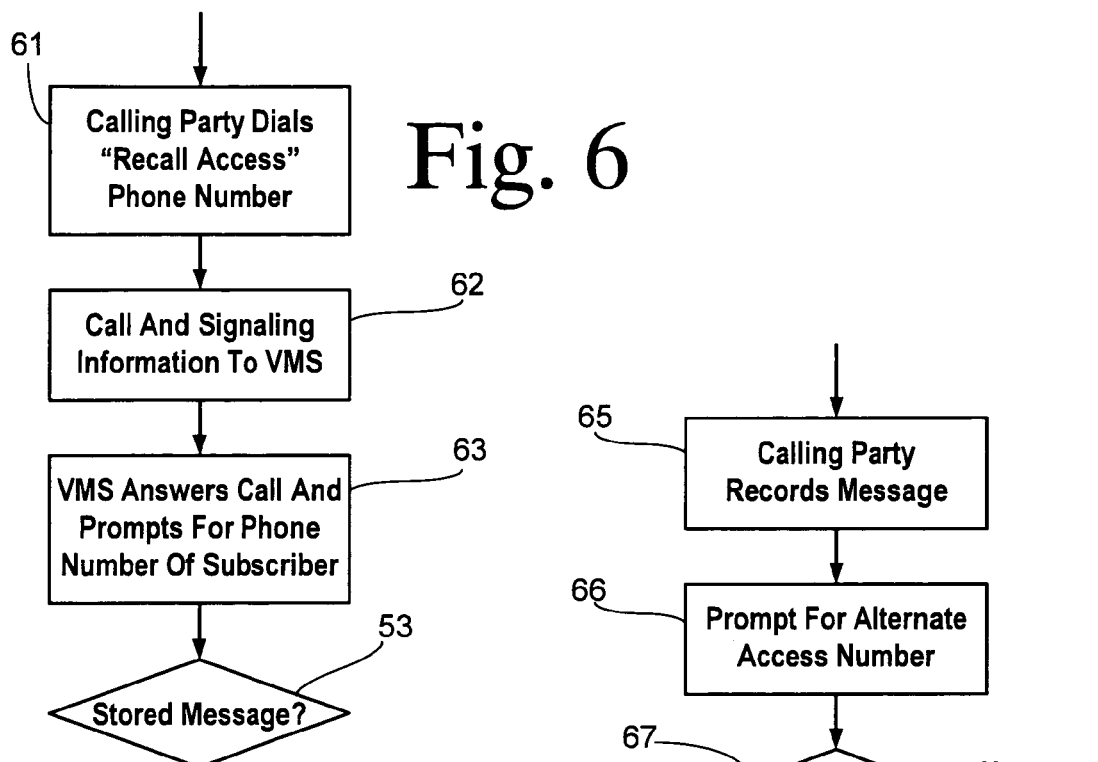
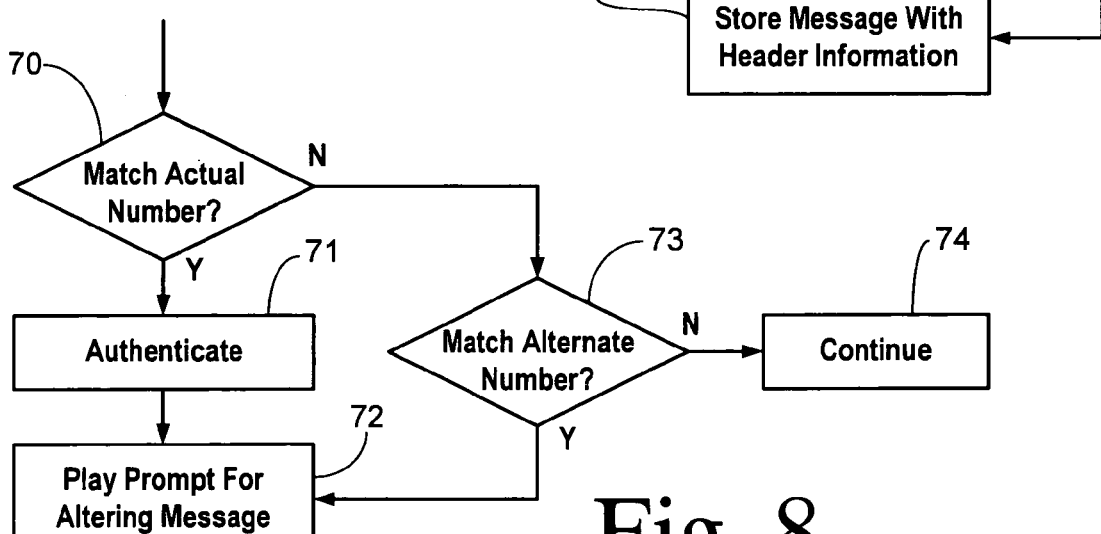

VOICEMAIL RECALL FEATURE

CROSS REFERENCE TO RELATED APPLICATIONS

Not applicable.

STATEMENT REGARDING FEDERALLY SPONSORED RESEARCH

Not applicable.

BACKGROUND OF THE INVENTION

The present invention relates in general to voice messaging in a telecommunications system, and, more specifically, to voicemail recall features wherein stored messages can be deleted or reprioritized.

Conventional voice mail systems create a mailbox for a person associated with a called telephone number (i.e., the subscriber). When incoming calls are unanswered within a certain number of rings, they are directed to a voice mail server allowing the caller to create a recorded message to be later retrieved by the subscriber. The subscriber accesses their mailbox in order to manage the mailbox (e.g., record a personal greeting), to review message details (e.g., day and time of message), to listen to messages, and to delete messages. The subscriber is typically required to enter a valid pin code or password in order to gain access to the mailbox.

It has been recognized that as time passes, any unretrieved messages may become superfluous or no longer accurate. When new information becomes available, the party who left a prior message may decide to make the new information available to the mailbox subscriber by calling and leaving an additional message. Since two messages would then be in the mailbox, and since the older, inaccurate message would typically be played back first when the subscriber retrieves messages, inefficiency and confusion result.

By way of example, a person who has misplaced their car keys and believes that they will be late for work or an appointment places a phone call to someone who will be expecting their arrival. The phone goes unanswered and the caller is connected with voicemail to leave a message. Shortly thereafter, the person finds their car keys and realizes that they still have time to arrive on time. Leaving a second message retracting the first one causes potential embarrassment for the person and wastes time for the recipient. By permitting the person to recall (i.e., delete) the first message, these problems can be avoided.

U.S. Pat. No. 5,966,351, issued to Carleton et al, discloses a voice mail system wherein a sender of a message who is an authorized user of the voice mail system can access stored messages in a recipient's mailbox that were originally recorded by the sender. The sender is allowed to re-prioritize or delete messages in the recipient's mailbox that have not yet been retrieved provided the sender is authenticated by providing correct login information. Both the sender and recipient of a message are required to be subscribers of the same voicemail system.

U.S. Pat. No. 6,614,887, issued to Satapathy et al, allows calling parties to create sub-mailboxes within the subscriber's mailbox. A sub-mailbox is addressed according to the calling party's phone number. Each sub-mailbox is protected by an associated PIN code which is set-up during first use of the sub-mailbox. A caller is required to enter the PIN code prior to deleting or re-ordering messages previously left in the sub-mailbox. While the requirement for the sender and recipient to subscribe to the same voicemail system is avoided, a relatively greater number of command prompts and responses are involved. Added command prompts and responses must be navigated even when the caller is the subscriber or when there are no stored messages to be deleted. It would be desirable to reduce the command interactions needed to permit a caller to alter a previously recorded message.

Use of a PIN code for securing a sub-mailbox entails administrative overhead. For example, when a user forgets their PIN code then administrative act must be taken to recover the PIN code or assign a new one. Entry of the PIN code also makes the voicemail system more cumbersome and slower to use. Thus, it would be desirable to maintain security of stored messages without requiring entry of a PIN code or other login information.

SUMMARY OF THE INVENTION

The present invention has the advantages of automatically determining whether a calling party has any pending, unheard messages in a subscriber's mailbox and authenticating a calling party without entry of any ID's, passwords, or PIN codes.

In one aspect of the invention, a voicemail apparatus comprises a voicemail database for storing messages awaiting retrieval by a subscriber. Each stored message comprises a message header and message data, the message header including a calling party phone number and calling party network information. A voicemail controller is coupled to the voicemail database and to a switch of a telecommunications network for handling an incoming call from a calling party to the subscriber which is not answered by the subscriber. The voicemail controller compares the calling party phone number of the incoming call with calling party phone numbers of each of the stored messages for the subscriber. If the calling party phone number of the incoming call matches at least one calling party phone number of the stored messages then the incoming call is authenticated by comparing the calling party network information for the incoming call with calling party network information stored for the calling party phone number matching messages. If the calling party network information for the incoming call matches calling party network information stored for the calling party phone number matching messages then an option is presented to the calling party of the incoming call to alter those stored message for which the calling party network information matches.

BRIEF DESCRIPTION OF THE DRAWINGS

FIG. 6 is a flowchart showing an alternative embodiment using a dedicated telephone number for recall access.

FIG. 7 is a flowchart showing an alternative embodiment for permitting authentication of additional telephone numbers for a particular stored message.

FIG. 8 is a flowchart showing an alternative method for recall access in accordance with alternate telephone numbers identified pursuant to the method of FIG. 7.

DETAILED DESCRIPTION OF PREFERRED EMBODIMENTS

The present invention uses DTMF and/or voice recognition to allow callers to select previously stored voice messages to be recalled (i.e., deleted). Voicemail controller software also allows the caller to replace a previously recorded message with a new recording. The voice mail software plays the message header information to the caller and then the actual recorded message previously left by the same caller. The calling party is then given the option to delete, reprioritize, or replace the message with the new recording. The voicemail controller software allows the caller to recall or replace multiple messages in the same call session.

The present invention is not restricted to any particular telecommunications environment and can work using various call signaling types such as SS7, ISDN, or VoIP, for example. The features of the present invention can be implemented in either wireless or wireline networks.

Figure 1:
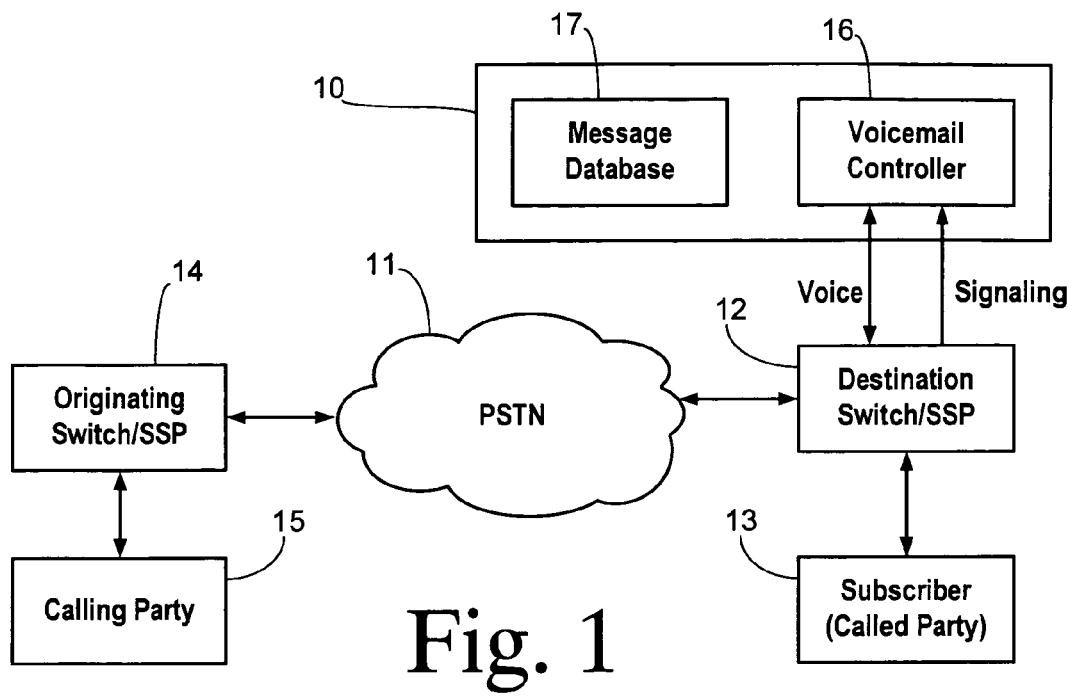
FIG. 1 is a block diagram of a telecommunications network implementing the present invention.

Referring now to FIG. 1, a voicemail system (VMS) 10 is connected to a telecommunication network such as a public switched telephone network (PSTN) 11 via a destination switch 12. A subscriber station 13 corresponding to a subscriber to voicemail services may be connected to destination switch 12. The subscriber's line can alternatively be connected to any other switch, (i.e., VMS 10 can be located anywhere within the network with respect to either the subscribers or the calling parties). An originating switch 14 is connected to PSTN 11 through which a calling party 15 originates a call to subscriber 13.

VMS 10 comprises a voicemail controller 16 connected to a message database 17. Destination switch 12 exchanges both voice signals and signaling traffic with voicemail controller 16 in order to implement the voicemail services described herein.

Figure 2:
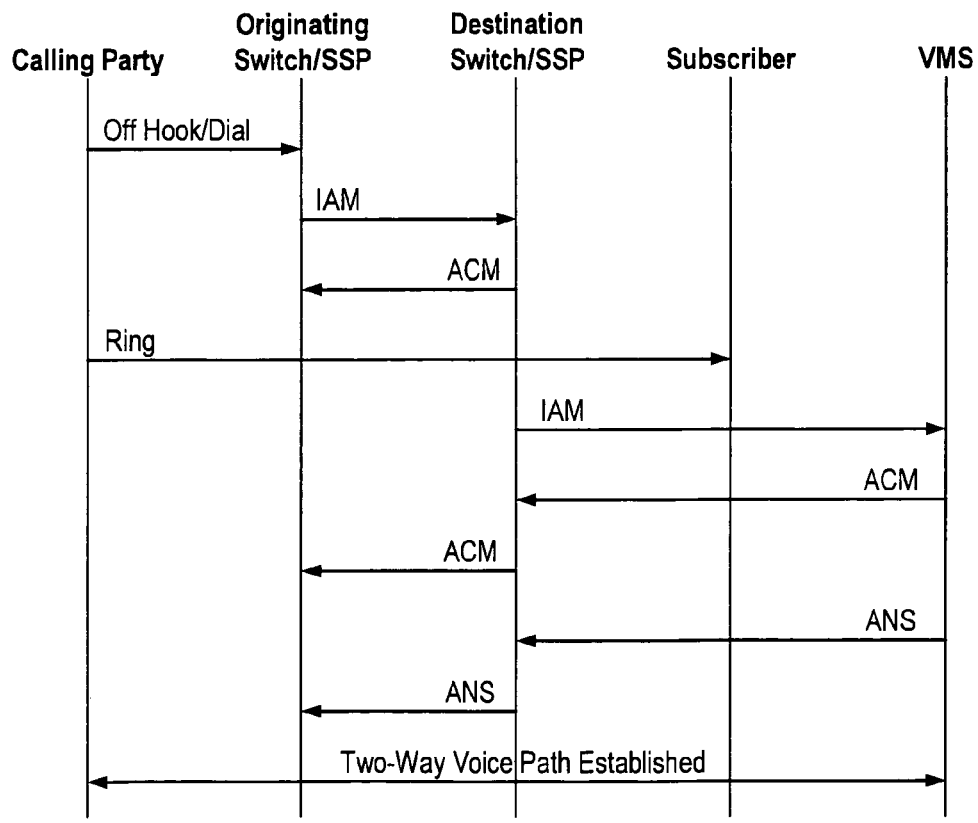
FIG. 2 shows a message flow for calls made in the network of FIG. 1.

FIG. 2 shows a typical call sequence according to the present invention. Initially, a calling party goes off-hook and dials a voicemail subscriber's telephone number, which is received by the originating switch, or more specifically the service switching point (SSP). The switch/SSP generates an Initial Address Message (IAM) which is sent to the destination switch/SSP in an attempt to reserve an idle trunk in the telecommunications network so that the call can be placed to the called party/subscriber. If the subscriber's line is not busy, then the destination switch/SSP responds with an Address Complete Message (ACM) to the originating switch/SSP. The desired call is then connected and rings through from the calling party to the subscriber. After a predetermined time, the destination switch/SSP detects that there has been no answer by the subscriber and it then redirects the call to the VMS system by sending the VMS an IAM. The IAM sent to the VMS controller includes signaling information comprising a calling party telephone number and other calling party network information described below. The ACM is sent by the destination switch/SSP to the originating switch/SSP. The VMS system sends an answer message (ANS) to the destination switch/SSP, and the ANS is also forwarded to the originating switch/SSP. Thereafter, destination switch/SSP extends the voice call to the VMS system so that a two-way voice path is established between the calling party and the VMS system. Using the call signaling information from the switch, the VMS system can properly interact with the calling party to automatically identify and authenticate for stored messages left by the calling party already residing on the VMS system, as also described below.

Figure 3:
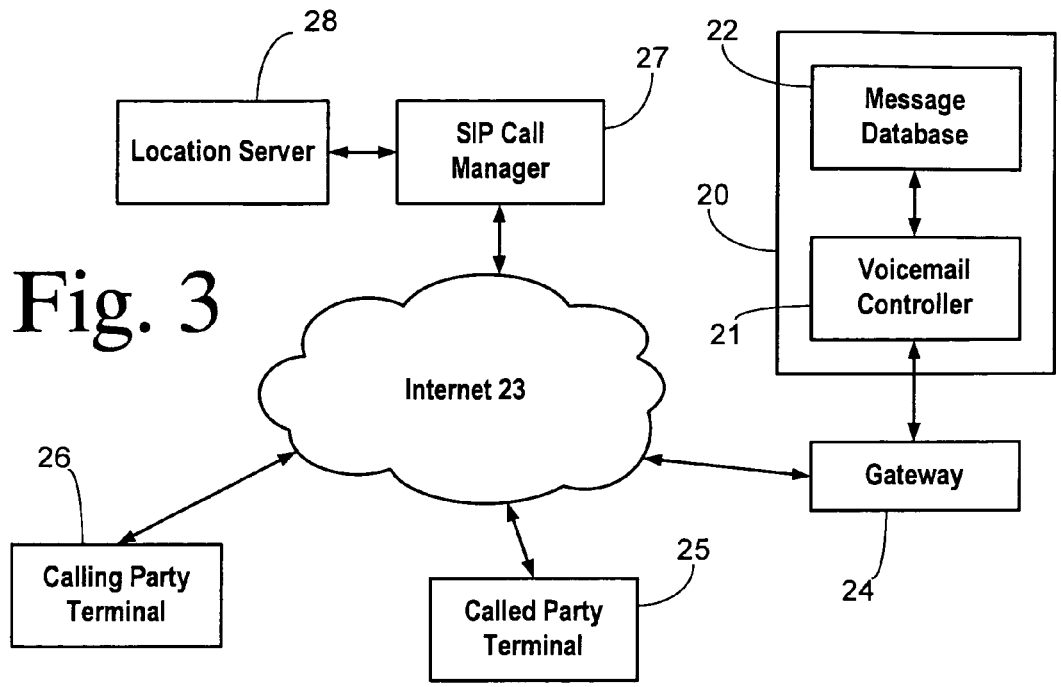
FIG. 3 is a block diagram showing a digital data network implementation of the present invention.

FIG. 3 shows an alternative network architecture for implementing the invention using IP telephony in a digital data network. A VMS 20 includes a voicemail controller 21 and a message database 22. Voicemail controller 21 is connected to a data network such as Internet 23. A gateway 24 may be provided for linking VMS 20 with Internet 23. A called party (i.e., subscriber) terminal 25 and a calling party terminal 26 are connected to Internet 23, possibly via internet service providers (not shown). A SIP call manager 27 is connected to Internet 23 for providing IP telephony service within the data network. Any conventional SIP call manager technology can be used. A location server 28 may be provided to assist in finding the current IP address where a particular called party can be reached.

Call set-up in a data network using the SIP protocol is similar to the process in the public telephone network shown in FIGS. 1 and 2 in that a message similar to an Initial Address Message is generated by the calling party to identify themselves. In particular, a SIP-Invite message sent to SIP call manager 27 (or in some cases directly to the called party 25) includes a remote-party-ID header, including attributes such as a screening indicator, ID-type, and other network related data. Any such network data that has a consistent value each time a call is placed by the calling party from their respective terminal can be used to later authenticate the same calling party.

Figure 4:
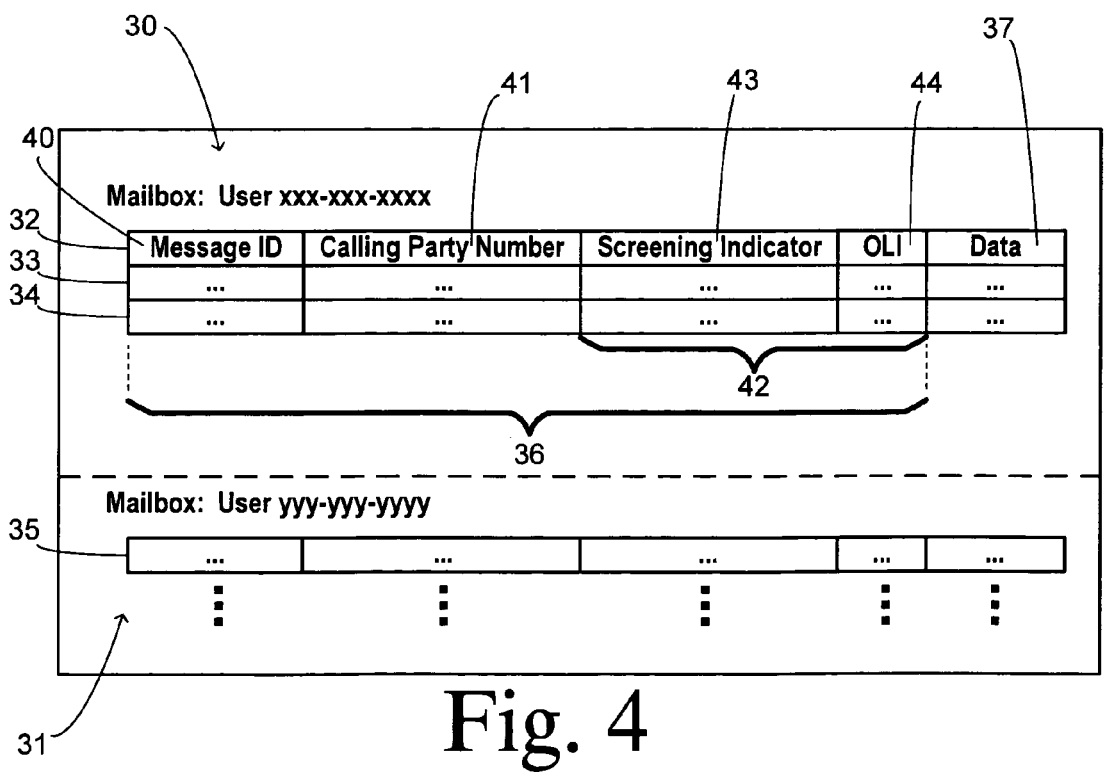
FIG. 4 shows the organization of a voicemail database according to the present invention.

FIG. 4 shows the contents of the message database according to a preferred embodiment of the present invention. Mailboxes 30 and 31 are provided for respective users. Each mailbox may be identified by the telephone number of the respective user or by any other identifier. The mailboxes store individual stored messages 32-35, for example. Each stored message includes a message header 36 and message data 37. Message header 36 includes various digital data identifying a message and its parameters while data 37 is a digitized recording of the voice message recorded by the calling party.

Header 36 includes fields such as a message ID 40, a calling party telephone number 41, and network information 42. Calling party telephone number 41 is derived from the calling line information provided by an originating switch to the destination switch during the original call to the subscriber. Calling party telephone number 41 may comprise an E.164 telephone number address in a traditional telephone network or may comprise an IP address or a logical address in a computer based digital network such as a VoIP network. For various reasons, the calling party telephone number may or may not be the actual telephone number (or IP address) from which the calling party dialed. The calling line information (CLI) or caller ID information reported by the switch can be spoofed, i.e., an incorrect and fraudulent value can be placed in the field under certain circumstances by the caller or by another person with access to network systems (especially with calls placed within or passing through VoIP networks). Therefore, there is insufficient security in relying upon a matching calling party telephone number in order to enable access to previously stored messages. The present invention relies on additional network information 42 which is stored as part of each stored message. Network information 42 includes a screening indicator 43 and an originating line type 44, for example. The screening indicator has a digital value identifying whether the calling party phone number is user provided or network provided and in some cases whether or not the number has been verified by the network. Typically, the screening indicator has been used for indicating whether or not the switch has verified that calls from a particular number are allowed and to indicate whether the number is assigned to terminal equipment (e.g., a line or a trunk), or if the number is a user provided number from behind a PBX. Originating line information (OLI) identifies the type of line from which the call originated (e.g., residential, payphone, hotel, prison, or cellular). Any variance in these items of network information would indicate that the calling party telephone number is being spoofed and is likely not being made by the same person who left the original stored message. Added storage fields for the network information in the stored messages can be implemented in conventional voicemail controllers by making a simple software change.

Figure 5:
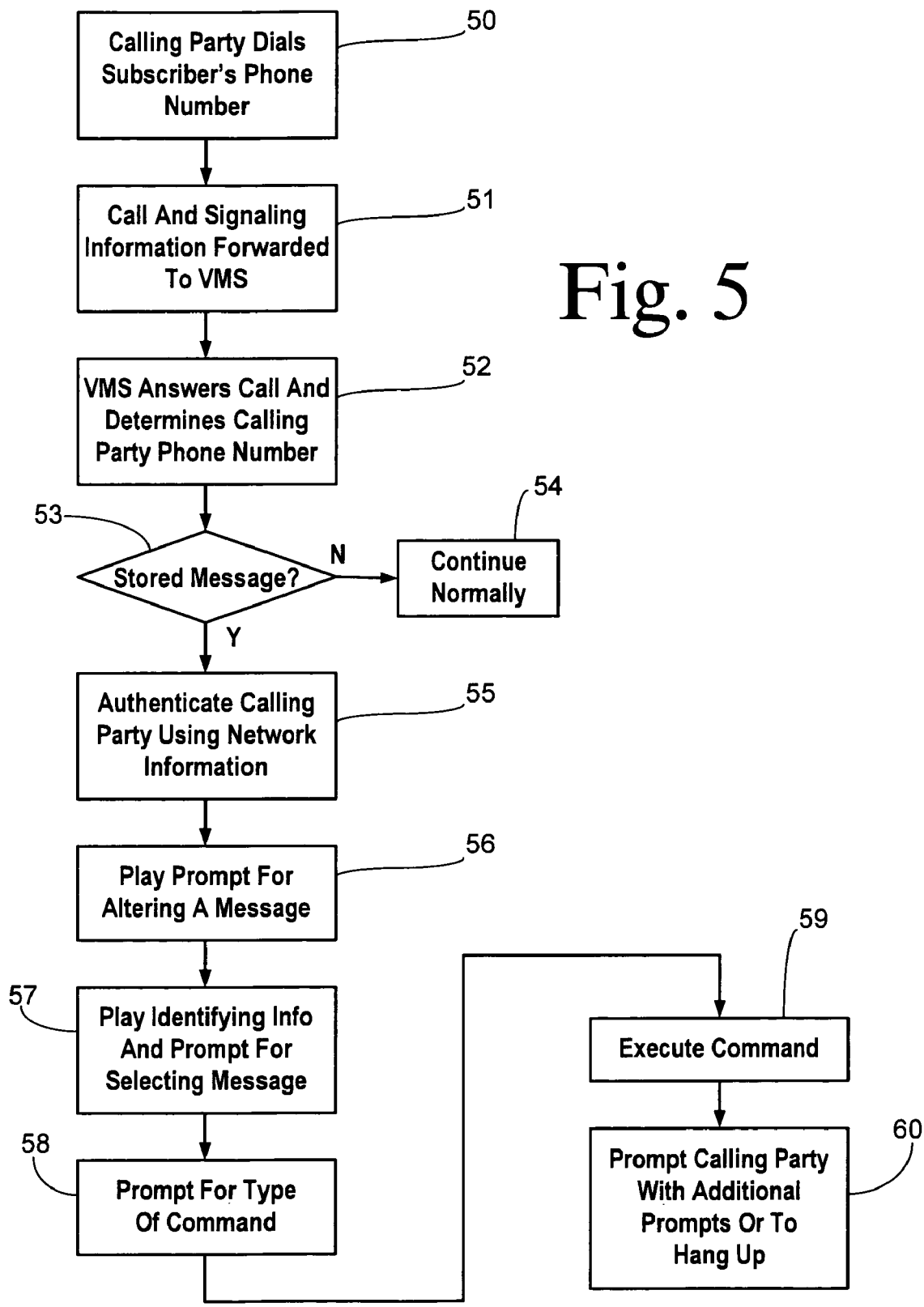
FIG. 5 is a flowchart of a preferred embodiment of a method for deleting or reprioritizing pending messages in a voicemail system.

A preferred embodiment of the method for handling an incoming call wherein a voicemail system automatically determines whether there are pending, unheard stored messages for a subscriber that were left by an incoming party is shown in FIG. 5. In step 50, the calling party dials the subscriber's telephone number. When the call goes unanswered, then the destination switch forwards the call and its signaling information to the voicemail system in step 51. The voicemail system answers the call in step 52 and determines the calling party telephone number based on the caller ID or CLI information provided in the signaling information by the switch. In step 53, the voicemail system compares the calling party phone number from step 52 with the stored calling party telephone number in the header of each stored message within the mailbox corresponding to the subscriber. If no matching messages are found, then the calling party could not be entitled to alter any messages and therefore handling of the calling party's call can continue normally in step 54 (i.e., prompting the caller to leave a recorded message in the conventional manner).

If matching stored messages are found according to the calling party's telephone number, then the voicemail system attempts to authenticate the calling party using call signaling network information in step 55. The calling party network information included in the call signaling information is compared with the calling party network information within the matching stored messages found in step 53. Preferably, all items of network information including, but not limited to, the screening indicator and the originating line information must match in order to authenticate the calling party. If the calling party is not able to be authenticated with regard to the stored network information of any matching method, then no stored message alteration will be allowed and the calling party returns to conventional message recording in step 54.

If matching network information is found for one or more messages, then a message recall menu will be presented to the calling party by the voicemail system. Many different menu organizations and features can be used and just one example is shown in FIG. 5. In step 56, a prompt is played to the calling party to query whether it is desired to alter a stored message. If the calling party is not calling to alter a message then they so respond and then processing can return to conventional message recording in step 54. Otherwise, the voicemail system plays identifying information in step 57 for each message and then prompts the calling party for an indication whether a particular message is one to be altered. The identifying information being played may include the date and time of a stored message (from the header) and/or the actual message content (from the digitized audio). After the caller identifies a message, the voicemail system plays a prompt in step 58 querying for the type of command to be executed. Commands may include deleting a message or reprioritizing (i.e., reordering) the message. Once the calling party indicates their selected command, it is executed in step 59. Then in step 60, the voicemail system plays additional prompts to the calling party, such as allowing them to leave a new message (voice or numeric page) or directing the calling party to hang-up if they are finished. After leaving a new message or sending a numeric message, it may also be desirable to allow the calling party to return to the message selection menu for altering further messages.

The method of FIG. 5 shows the calling party direct dialing the subscriber's telephone in order to access the voicemail system. Alternatively, a dedicated number for recall access within a voicemail system may be used as shown in FIG. 6. The dedicated "recall access" phone number provides direct access to the voicemail system. After the calling party dials the "recall access" phone number in step 61, the call is completed to the VMS system in step 62 with the switch sending the call and its signaling information. After the voicemail system answers the call in step 63, it prompts the calling party to specify the phone number of the subscriber so that the appropriate mailbox can be identified. Thereafter, the method may proceed in the same manner as shown in FIG. 5 beginning at step 53.

As a further enhancement of the present invention, when leaving a message, the calling party can be presented with an option to allow recalling (i.e., deleting or reprioritizing) messages during subsequent calls from other telephone numbers. The prompting for specifying an alternate phone number would fit in seamlessly with the prompt set flow that asks the calling party to specify a priority for the message being deposited, for example. Although there would be no calling party network information to capture for this alternate number, this enhancement would still be considered to be secure since others would not know that a voicemail had been left in the target mailbox which specified the alternate number. Nevertheless, this enhancement may be somewhat less secure and therefore a warning or disclaimer message to the calling party may be appropriate to remind them that no validation will be possible during a subsequent call that attempts to recall the message from the alternate phone number.

This enhancement is shown more specifically in FIG. 7 wherein a portion of the process for recording voicemail messages is shown. The calling party records their message in step 65. Then in step 66, the voicemail system prompts the calling party for an alternate access number. If the calling party chooses not to specify an alternate access number in step 67, then the message and its message header are stored in step 69 without including an alternate access number. If the calling party chooses to specify an alternate access number in step 67, then a warning message is played in step 68 and then the voicemail system collects the alternate number from the calling party. Then in step 69 the message is stored along with a header that includes the alternate access number. In a preferred embodiment, both the alternate access number and the calling party phone number from which the message is being deposited are stored as part of the message header. Then, the message can subsequently be altered from either telephone number. Alternatively, the voicemail system could prompt the calling party to specify whether only one of the phone numbers can be used to subsequently alter the message.

FIG. 8 shows a modification to the method of FIG. 5 in order to accommodate the enhancement for altering messages from alternate telephone numbers. In step 70, a check is made to determine whether the calling party telephone number of the incoming call matches the actual telephone number stored in a stored message header. If the actual number is matched, then authentication is performed in step 71 as discussed previously. Then a prompt is played in step 72 to query whether the message is to be altered. If the incoming phone number fails to match the actual number stored in a message in step 70, then a check is made in step 73 to determine whether the incoming phone number matches an alternate access number in step 73. If an alternate access number is matched, then the voicemail system plays a prompt for altering the message in step 72. If no alternate access numbers are matched in step 73, then conventional voicemail processing continues in step 74 without presenting the menu for recalling a message.

What is claimed is:

1. Apparatus comprising:
   a voicemail database for storing messages awaiting retrieval by a subscriber, each stored message comprising a message header and message data, said message header including a calling party phone number and calling party network information; and
   a voicemail controller for coupling to said voicemail database and to a switch of a telecommunications network for handling an incoming call from a calling party to said subscriber which is not answered by said subscriber, wherein said voicemail controller compares said calling party phone number of said incoming call with calling party phone numbers of each of said stored messages for said subscriber;
   wherein if said calling party phone number of said incoming call matches at least one calling party phone number of said stored messages then authenticating said incoming call by comparing said calling party network information for said incoming call with calling party network information stored for said calling party phone number matching messages; and
   wherein if said calling party network information for said incoming call matches calling party network information stored for said calling party phone number matching messages then presenting an option to said calling party of said incoming call to alter those stored message for which said calling party network information matches.

2. The apparatus of claim 1 wherein said calling party network information is obtained from an initial address message transmitted in said telecommunications network for setting up a respective call.

3. The apparatus of claim 2 wherein said telecommunications network comprises a switched telephone network and wherein said initial address message is transmitted within an SS7 signaling system.

4. The apparatus of claim 3 wherein said calling party network information comprises a screening indicator.

5. The apparatus of claim 3 wherein said calling party network information comprises an originating line type.

6. The apparatus of claim 2 wherein said telecommunications network comprises a data network and wherein said initial address message is transmitted within a Remote-Party-ID header of a SIP-Invite message.

7. The apparatus of claim 1 wherein said option to alter a stored message comprises deleting a stored message.

8. The apparatus of claim 1 wherein said voicemail controller plays message identifying information prior to altering said stored message.

9. The apparatus of claim 8 wherein said message identifying information includes data and time of said stored message.

10. The apparatus of claim 1 wherein said incoming call is directed to a dedicated phone number for accessing said voicemail controller and wherein said voicemail controller prompts a calling party for a subscriber telephone number.

11. The apparatus of claim 1 wherein said voicemail controller prompts a calling party to specify an alternate telephone number from which to subsequently permit altering of a stored message created by said calling party without using said calling party network information, and wherein said alternate telephone number is stored in said stored message header.

12. A method for operating a voicemail system comprising the steps of:
    activating a voicemail processor in response to an incoming call from a calling party;
    said voicemail processor receiving call signaling information from a telecommunications switch handling said call;
    determining if said calling party previously left a stored message which is awaiting retrieval by a subscriber in response to a calling party telephone number included in said call signaling information;
    comparing calling party network information included in said call signaling information with calling party network information of stored messages found in said determining step;
    if matching calling party network information is found, then playing identifying information of said matching stored message to said calling party;
    prompting said calling party for a command for altering said matching stored message; and
    altering said matching stored message according to said command.

13. The method of claim 12 wherein said call signaling information comprises an initial address message transmitted for setting up a respective call.

14. The method of claim 13 wherein said telecommunications switch is part of a switched telephone network and wherein said initial address message is transmitted within an SS7 signaling system.

15. The method of claim 13 wherein said calling party network information comprises a screening indicator.

16. The method of claim 13 wherein said calling party network information comprises an originating line type.

17. The method of claim 13 wherein said telecommunications switch is part of a data network and wherein said initial address message is transmitted within a Remote-Party-ID header of a SIP-Invite message.

18. The method of claim 12 wherein said command for altering said matching stored message comprises a deletion command.

19. The method of claim 18 further comprising the step of:
    prompting said calling party for recording a new message to be stored for said subscriber.

20. The method of claim 12 further comprising the step of:
    said voicemail controller playing message identifying information prior to altering said stored message.

21. The method of claim 20 wherein said message identifying information includes data and time of said stored message.

22. The method of claim 12 wherein said incoming call is directed to a dedicated phone number for accessing said voicemail controller, said method further comprises the step of:
    said voicemail controller prompting said calling party for a subscriber telephone number.

23. The method of claim 12 further comprising the steps of:
    said voicemail controller recording a message to be stored for said subscriber; and
    said voicemail controller prompting said calling party to specify an alternate telephone number from which to subsequently permit altering of a stored message created by said calling party without using said calling party network information; and
    storing said alternate telephone number together with said stored message.

* * * * *